United States Patent
Yamashiro

(10) Patent No.: US 8,599,038 B2
(45) Date of Patent: Dec. 3, 2013

(54) VEHICULAR WIRELESS COMMUNICATION APPARATUS AND COMMUNICATION SYSTEM

(75) Inventor: Takahisa Yamashiro, Chiryu (JP)

(73) Assignee: Denso Corporation, Kariya (JP)

( * ) Notice: Subject to any disclaimer, the term of this patent is extended or adjusted under 35 U.S.C. 154(b) by 5 days.

(21) Appl. No.: 13/547,514

(22) Filed: Jul. 12, 2012

(65) Prior Publication Data

US 2013/0015984 A1    Jan. 17, 2013

(30) Foreign Application Priority Data

Jul. 16, 2011    (JP) .................................. 2011-157284

(51) Int. Cl.
*G08G 1/16*    (2006.01)
*G08G 1/00*    (2006.01)

(52) U.S. Cl.
USPC ............ 340/903; 340/902; 340/904; 340/435

(58) Field of Classification Search
USPC ............ 340/435, 436, 901–904, 933; 455/39, 455/414, 414.2; 901/1, 96; 180/167, 169
See application file for complete search history.

(56) References Cited

U.S. PATENT DOCUMENTS

| | | | | |
|---|---|---|---|---|
| 6,054,936 A | * | 4/2000 | Yamagata et al. ............ | 340/903 |
| 6,150,931 A | * | 11/2000 | Yamagata et al. ............ | 340/435 |
| 6,553,282 B2 | * | 4/2003 | Shirai et al. ...................... | 701/1 |
| 6,553,283 B2 | * | 4/2003 | Shirai et al. ...................... | 701/1 |
| 6,650,235 B2 | * | 11/2003 | Shirai et al. .................... | 340/435 |
| 7,027,771 B1 | * | 4/2006 | Sato et al. ......................... | 455/39 |
| 7,271,762 B2 | * | 9/2007 | Samukawa et al. ........... | 342/173 |

FOREIGN PATENT DOCUMENTS

| | | |
|---|---|---|
| JP | 10-021500 | 1/1998 |
| JP | 2000-090395 | 3/2000 |
| JP | 2000-348300 | 12/2000 |
| JP | 2009-278536 | 11/2009 |

* cited by examiner

*Primary Examiner* — Van T. Trieu
(74) *Attorney, Agent, or Firm* — Harness, Dickey & Pierce, PLC

(57) ABSTRACT

A vehicular wireless communication apparatus is disposed in a subject vehicle to establish vehicle-to-vehicle communication between the subject vehicle and other vehicles having the apparatus. The apparatus of the subject vehicle receives sensor state information from an immediate following vehicle. Based on the sensor state information, the apparatus of the subject vehicle controls a transmission cycle of the information transmitted. A longer interval is selected when the immediate following vehicle has a range sensor and the range sensor successfully detects an obstacle in front of it. A standard interval, shorter than the longer interval, is selected when the immediate following vehicle does not have the range sensor or when the immediate following vehicle has the range sensor but the range sensor failed to detect the obstacle. Therefore, the transmission cycle is dependent upon the need of the information while preventing congestion of information transmission.

8 Claims, 5 Drawing Sheets

VEHICULAR WIRELESS COMMUNICATION APPARATUS AND COMMUNICATION SYSTEM

CROSS REFERENCE TO RELATED APPLICATION

The present application is based on and claims the benefit of priority of Japanese Patent Application No. 2011-157284, filed on Jul. 16, 2011, the disclosure of which is incorporated herein by reference.

TECHNICAL FIELD

The present disclosure generally relates to a vehicular wireless communication apparatus and a communication system including the vehicular wireless communication apparatus.

BACKGROUND

A technique regarding organizing a convoy of vehicles, in which a train of vehicles keep a certain inter-vehicle distance and follow a lead vehicle, is disclosed in, for example, Japanese Patent Laid-Open No. 2009-278536 (JP '536). The technique of JP '536 provides for wireless communication between terminals disposed in each of the vehicles of the convoy (i.e., vehicle-to-vehicle communication). That is, when traveling as a convoy, or as a group of vehicles, each of the vehicles of the convoy, except for the last vehicle, transmits position information of the vehicle and other information to a following vehicle at regular intervals, since each vehicle may possibly serve as a lead vehicle (i.e., a pace vehicle) in the convoy. The information received by the following vehicle is utilized for the travel of the following vehicle itself, for organizing the convoy.

However, the technique of JP '536 is problematic in terms of suffering from congestion of transmitted information. In other words, the technique may cause congestion of transmitted information from each of the convoy vehicles, because each of the convoy vehicles transmits, at regular intervals through vehicle-to-vehicle communication, information such as a vehicle position and the like, and each of the transmitted information occupies a certain bandwidth, which increases the possibility of congestion of the transmitted information, especially when many vehicles are organized as one convoy.

If a longer transmission cycle (i.e., a longer transmission interval) is used in the vehicle-to-vehicle communication, it may prevent an increase of the bandwidth of each of the transmitted information, thereby making it less possible to cause congestion. However, under such circumstance, if the convoy vehicle needs to receive the transmitted information very frequently, the longer transmission cycle of the vehicle-to-vehicle communication may cause a problem in such information-demanding vehicle.

SUMMARY

In an aspect of the present disclosure, the vehicular wireless communication apparatus, disposed in a subject vehicle, establishes vehicle to vehicle communication with an object vehicle having an object vehicle side wireless communication apparatus installed therein. The vehicular wireless communication apparatus has a reception unit for receiving (i) current position information indicating a position of the object vehicle and (ii) an independent sensor information indicating at least one of (a) whether the object vehicle is equipped with a range sensor that independently detects a distance to an obstacle in front of the object vehicle and (b) whether the range sensor has succeeded or failed to detect the obstacle.

The vehicular wireless communication apparatus also includes a following vehicle information reception determination unit to determine whether the object vehicle is an immediate following vehicle. Specifically, when the vehicular wireless communication apparatus of the subject vehicle receives the current position information and the independent sensor information of the object vehicle, the following vehicle information reception determination unit determines whether the received information is from the object vehicle side wireless communication unit is installed in an immediate following vehicle that is immediately following the subject vehicle (i.e., right behind the subject vehicle) based on a current position of the subject vehicle acquired by an information acquisition unit and the current position information of the object vehicle received by the reception unit.

The vehicular wireless communication apparatus includes a transmission cycle control unit to change a transmission cycle of transmitting the current position information of the subject vehicle from the vehicle wireless communication apparatus of the subject vehicle. Specifically, when the following vehicle information reception determination unit determines that the reception unit has received information from the object vehicle side wireless communication unit that is installed in the immediate following vehicle of the subject vehicle, the transmission cycle control unit changes the transmission cycle based on the independent sensor information that is received from the object vehicle. In other words, the vehicular wireless communication apparatus is capable of changing the transmission cycle based on (i) whether the immediate following vehicle is equipped with the range sensor and/or (ii) whether the range sensor in the immediate following vehicle has succeeded or failed to detect the obstacle.

When the immediate following vehicle follows the subject vehicle, it is necessary to perform an automatic control of an inter-vehicle distance between the immediate following vehicle and the subject vehicle based on a detection of such inter-vehicle distance. In such case, the necessity of the immediate following vehicle to detect the current position of the subject vehicle may change depending on presence or absence of the range sensor and success or failure of the detection of the obstacle by the range sensor. More practically, the immediate following vehicle equipped with the range sensor can independently detect the inter-vehicle distance to the subject vehicle. Therefore, the necessity for using the current position of the subject vehicle to detect the inter-vehicle distance is low, and it is likely that the immediate following vehicle may not frequently need to receive the current position information of the subject vehicle.

On the other hand, when the immediate following vehicle is not equipped with the range sensor or has the range sensor but the range sensor failed to detect the obstacle (i.e., the subject vehicle), the need to detect the inter-vehicle distance to the subject vehicle based on the current position of the subject vehicle transmitted from the subject vehicle increases. Therefore, in such case, it is highly likely that the immediate following vehicle may frequently need to receive the current position information of the subject vehicle.

In view of the above, the configuration of the present disclosure enables that, according to presence or absence of the range sensor and success or failure of the detection by the range sensor, the transmission cycle of transmitting the information from the subject apparatus can be changed. Therefore, if the immediate following vehicle does not frequently need the current position of the subject vehicle, the transmission cycle is changed to have a longer interval, and, if the current position of the subject vehicle is required frequently, the information can be frequently transmitted at a shorter interval. As a result, the vehicle-to-vehicle communication for information transmission is enabled to become more congestion-proof while the transmission cycle is adjusted to have a more suitable frequency or interval.

In addition to the above, the subject vehicle has the range sensor installed therein, for independently detecting the obstacle in front of the subject vehicle. The object vehicle side wireless communication apparatus transmits the prediction information that at least includes the current position information of the object vehicle and allows calculation of a traveling position of the object vehicle in a future and the independent sensor information. Further, the vehicular wireless communication apparatus includes a lost determination unit for determining whether the range sensor on the subject vehicle has failed to detect the obstacle (i.e., the detection obstacle is "lost"), and a lost position identification unit for identifying a lost position, where the lost position is the position of the subject vehicle where the range sensor of the subject vehicle failed to detect the obstacle. The lost position may be based on the current position information of the subject vehicle acquired by the information acquisition unit when the lost determination unit determines that the range sensor has failed to detect the obstacle.

Further, even when the transmission cycle of transmitting the information from the subject vehicle is set to have the longer interval, which is longer than a standard interval, the transmission cycle control unit controls the transmission cycle to have the shorter interval before the arrival of the immediate following vehicle at the lost position. The shorter interval in this case is shorter than the longer interval for a successful detection by the range sensor of the object.

The present disclosure may be configured as a communication system having a vehicular wireless communication apparatus disposed in a subject vehicle and an object vehicle for establishing vehicle to vehicle communication by way of wireless communication between the subject vehicle and the object vehicle. The vehicular wireless communication apparatus of the object transmits to the subject vehicle the current position information and the independent sensor information of the object vehicle. Based on the current position information and the independent sensor information of the object vehicle, the vehicular wireless communication apparatus of the subject vehicle determines whether the object vehicle is an immediate following vehicle of the subject vehicle. If the object vehicle is the immediate following vehicle of the subject vehicle, the vehicular wireless communication apparatus of the subject vehicle changes the transmission cycle for transmitting the current position information of the subject vehicle to the object vehicle based on the independent sensor information of the object vehicle.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
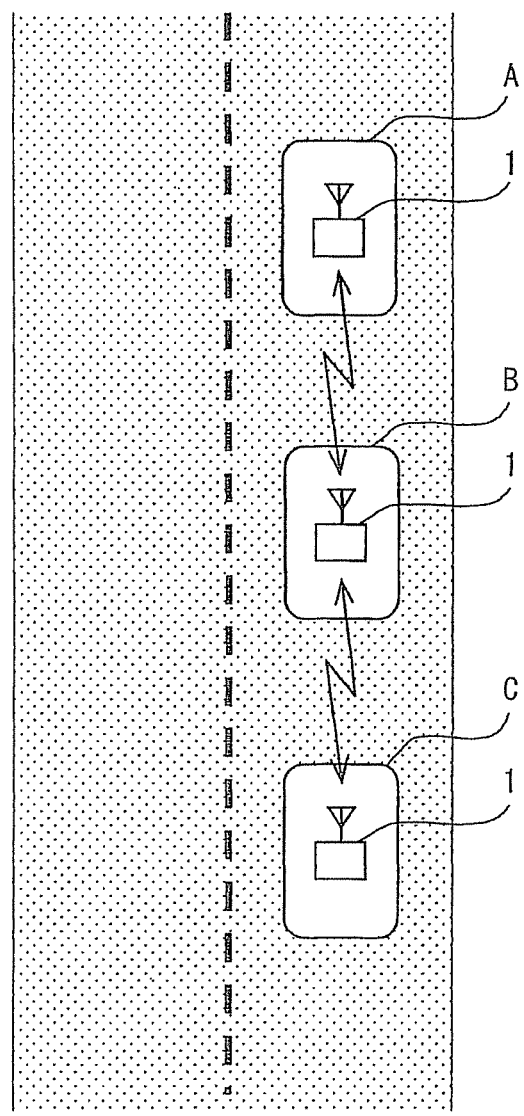
FIG. 1 is a block diagram of a communication system of the present disclosure.

The embodiment of the present disclosure is described with reference to the drawings. With reference to FIG. 1, a communication system 100 includes multiple wireless communication apparatuses 1 each being disposed in a vehicle. For instance, the communication system 100 of FIG. 1, depicts a wireless communication apparatus 1 installed in each of the vehicles A, B, where vehicles A, B are each equipped with a range sensor and a receiver of a satellite positioning system. In addition, a wireless communication apparatus 1 is disposed in a vehicle C, where vehicle C is equipped with a receiver of a satellite positioning system but is not equipped with a range sensor.

Though the communication system 100 of the FIG. 1 depicts three wireless communication apparatuses 1, the communication system 100 may include four or more wireless communication apparatuses 1 in the system 100, or only one or two wireless communication apparatus 1.

Figure 2:
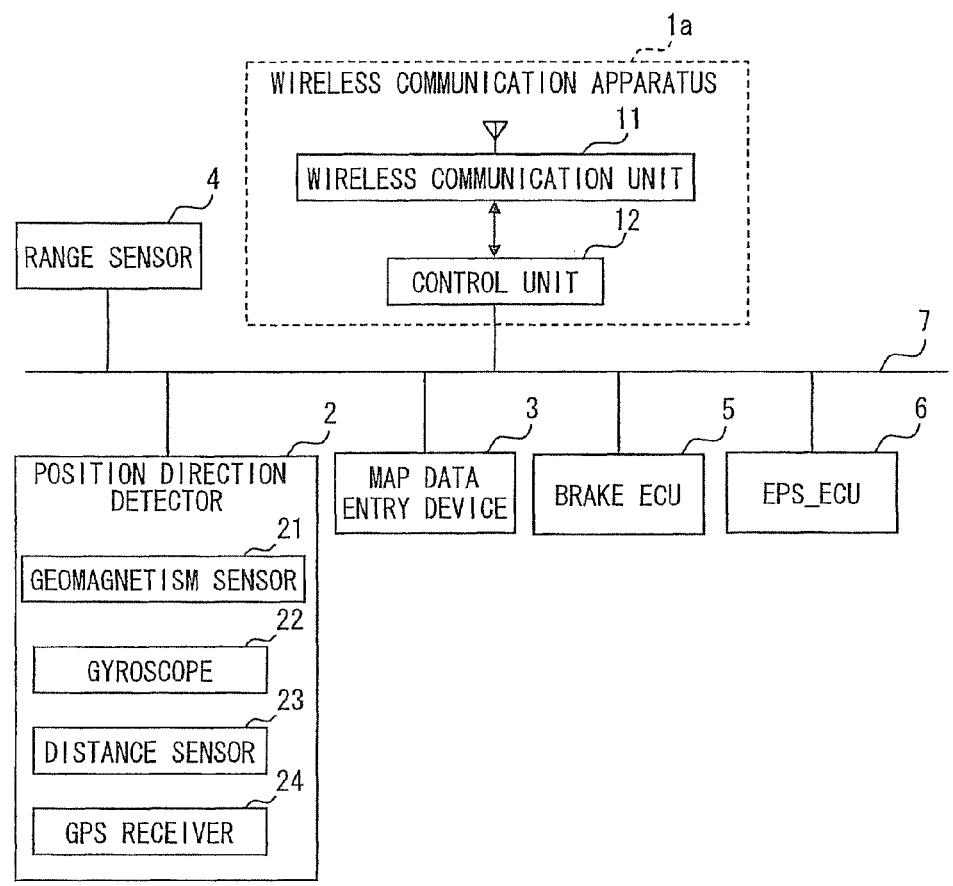
FIG. 2 is a schematic configuration of a wireless communication apparatus disposed in a vehicle with a range sensor.

With reference to FIG. 2, a block diagram of a wireless communication apparatus 1a is shown. The wireless communication apparatus 1a is disposed in a vehicle that is equipped with a range sensor and a receiver of the satellite positioning system, such as vehicles A, B of the present embodiment. The wireless communication apparatus 1a includes a wireless communication unit 11 and a control unit 12. In addition, the wireless communication apparatus 1a is communicably coupled to vehicle components of the vehicle (i.e., self-vehicle), such as a position direction detector 2, a map data entry device 3, a range sensor 4, a brake ECU 5, and an EPS_ECU 6. The wireless communication apparatus 1a, the position direction detector 2, the map data entry device 3, the range sensor 4, the brake ECU 5, and the EPS_ECU 6 may be communicably coupled with each other via, for example, an in-vehicle LAN 7, which is compliant with communication protocol, such as controller area network (CAN).

The term self-vehicle may be used to refer to the vehicle having the wireless communication apparatus 1, when details of the wireless communication apparatus 1 is provided in regards to the components and processes of the vehicle (i.e., self-vehicle) in which the wireless communication apparatus 1 is disposed.

The position direction detector 2 successively detects the current position and the current travel direction of the self-vehicle, based on information from a geomagnetism sensor 21 detecting geomagnetism, a gyroscope 22 detecting the angular velocity of the yaw of the self-vehicle about the vertical axis of the self-vehicle, a distance sensor 23 detecting the travel distance of the self-vehicle, and a GPS receiver 24 detecting the current position of the self-vehicle based on a signal from global positioning system (GPS) satellites. These sensors respectively have errors of different natures, thereby compensating with each other for improving the accuracy of the detection.

Each of the above-described sensors other than the GPS receiver 24 may be used by itself, depending on the accuracy of the sensor, or, may be combined with another sensor that may not have been described. Further, for example, the current position may be represented as a combination of longitude and latitude, and the current travel direction may be represented as a direction angle from a north, which serves as a reference direction. The direction angle may be detected by the geomagnetism sensor 21, may be detected by the gyroscope 22, or may be detected by a combination of both. In the following, the current position detected by the GPS receiver 24 is designated as a satellite-measured position. Further, in the present embodiment, the GPS receiver 24 using the GPS system may be substituted with a receiver of a different satellite positioning system.

The map data entry device 3 inputs map data stored in a storage medium to which the map data entry device 3 is coupled to. The map data includes link data and node data showing a road on the map. The link data includes an identification number (i.e., link ID) for identifying a link, a link length representing a length of the link, a link direction, coordinates of a link start point and a link end point (i.e., longitude and latitude), a road name, a road type, a one-way attribute, a road width, the number of lanes, a right/left turn dedicated lane and the number of such lanes, a speed limit, and the like. Further, the node data includes a node ID representing a node point such as an intersection, a merge point, a branch point, or the like on the road map, together with node coordinates, a node name, connecting link Ds of the links that are connected to the node, an intersection type of the node.

Further, the map data may not only be provided from the storage medium attached to the map data entry device 3, but may also be provided by other medium, or the data may be downloaded from a server through a server communication unit (not illustrated).

The range sensor 4 is an independent sensor automatically detecting the existence of an obstacle in front of the vehicle that is equipped with the wireless communication apparatus 1a, as well as a distance to such obstacle. Regarding the term "independent" used in the above context, it means that the range sensor 4 detects the obstacle without using information from other vehicles, or without using information from devices disposed in other vehicles. In the present embodiment, by using the range sensor 4, the existence of a lead vehicle, which is traveling immediately in front of the self-vehicle, and a distance from such lead vehicle are detected.

As for the range sensor 4, a device, such as a laser radar, a millimeter wave radar, which transmits a wave and receives a reflected wave from a reflecting object for detecting a distance, may be employed. Further, a camera may be used as the range sensor 4. When the camera is used as the range sensor 4, two cameras are used to stereoscopically capture the obstacle, for the purpose of detecting the existence and the distance of the obstacle. In the present embodiment, for illustrative purposes, a laser radar is used as the range sensor 4.

The brake ECU 5 is a combination of a microcomputer and other components, and the microcomputer is a combination of parts, such as a CPU, a ROM, a RAM, and a backup RAM. The brake ECU 5 performs various processes, which are stored in the ROM, about the braking of the self-vehicle based on, for example, vehicle information including a vehicle speed detected as a signal of the vehicle speed sensor, a steering torque detected as a signal from the torque sensor, a steering angle detected as a signal from the steering angle sensor, a lateral/longitudinal acceleration detected as a signal from acceleration sensors, a brake fluid pressure detected as a signal from the brake fluid sensor and the like.

The EPS_ECU 6 is a device for performing various processes, such as a steering assist process for assisting a steering operation of the steering wheel and a steering angle control process for controlling a steering angle of the steering wheel. Such processes are performed based on vehicle information including the vehicle speed detected as a signal of the vehicle speed sensor, the steering torque detected as a signal from the torque sensor, the steering angle detected as a signal from the steering angle sensor, a lateral acceleration detected as a signal from acceleration sensors, and the like.

The wireless communication apparatus 1a includes a wireless communication unit 11 and a control unit 12. The wireless communication unit 11 has an antenna for wireless communication with other vehicle(s) around the self-vehicle to exchange information, such as vehicle information. In other words, vehicle-to-vehicle communication is performed through the antenna of the wireless communication unit 11 without using a telephone communication through a telephone network. The other vehicle may be designated as a partner vehicle in the following. The wireless communication of a radio wave of 700 MHz band may be used for the vehicle-to-vehicle communication with the other vehicle (i.e., partner vehicle) within a distance of, for example, 1 km from the self-vehicle. As another example, the wireless communication of a radio wave of 5.9 GHz band may be used for the vehicle-to-vehicle communication with the partner vehicle within a distance of 500 m from the self-vehicle The wireless communication unit 11 is equivalent to a reception unit in claims. Further, the wireless communication unit 11 transmits information at a transmission cycle under control of the control unit 12.

The control unit 12 of the wireless communication apparatus 1a is a well-known type computer, having a bus line for connecting a processor and memories such as a CPU, a ROM a RAM, an EEPROM, as well as an input/output and the like (not illustrated). The control unit 12 performs various processes, based on information provided by the wireless communication unit 11, the position direction detector 2, the map data entry device 3, the range sensor 4, the brake ECU 5, and the EPS_ECU 6.

The control unit 12 successively acquires prediction information that predicts a traveling position of the vehicle in the future. The control unit 12 may acquire such information at regular intervals and transmits such information from the wireless communication unit 11. The prediction information includes a satellite-measured position, the travel direction, the turning radius, the speed, and the acceleration and deceleration of the self-vehicle. For instance, the information regarding the satellite-measured position and the travel direction of the self-vehicle may be acquired from the position direction detector 2. The control unit 12 is equivalent to an information acquisition unit in claims.

Further, in regards to the turning radius of the self-vehicle, information of the steering angle is acquired from the EPS_ECU 6 to which the information of the steering angle of a steering operation successively detected by the steering angle sensor is provided, and the turning radius is calculated based on such steering angle. Specifically, a relationship between the steering angle and the turning radius is pre-stored in a nonvolatile memory, such as the ROM or the EEPROM of the control unit 12, and based on the actual measurement and/or the data interpolation, the relationship is used to calculate the turning radius based on the actual measurement of the steering angle.

Furthermore, in regards to the vehicle speed and the acceleration and deceleration of the self-vehicle, such information is acquired from the brake ECU 5 and the EPS_ECU 6 to which information of the vehicle speed successively detected by the vehicle speed sensor and information of the acceleration and deceleration successively detected by the acceleration sensor is provided. Further, as the prediction information, a part of the above-described information may be used, or information other than the above-described information may also be used.

When the prediction information is transmitted, the control unit 12 may add, to the prediction information, an acquisition time of the prediction information (e.g., GPS time) at which the prediction information is acquired from GPS satellite. The time in the above context is the time in synchronization with the time of the atomic clock of the GPS satellite. In the present embodiment, the following description is based on an assumption that, when the prediction information is transmitted, the prediction information is transmitted together with the GPS time at which the satellite-measured position and the travel direction in the prediction information are detected.

In addition, the control unit 12 acquires sensor state information about the state of the range sensor 4 disposed in the self-vehicle, and the control unit 12 transmits such information together with the prediction information via the wireless communication unit 11. The sensor state information may provide information regarding whether the self-vehicle is equipped with the range sensor 4, the type of the range sensor 4, whether a detection by the range sensor 4 was successful or unsuccessful, and the like. The sensor state information is equivalent to an independent sensor information in claims.

The type of the range sensor 4 may be acquired from, for example, information pre-stored in the nonvolatile memory, such as the ROM, the EEPROM of the control unit 12. Further, in the example of the present embodiment, the type of the range sensor 4 is a laser radar. Whether the vehicle is equipped with the range sensor 4 or not may also be acquired from information pre-stored in the nonvolatile memory, such as the ROM, the EEPROM of the control unit 12. In the present embodiment, the vehicles A. B, which includes the wireless communication apparatus 1a, are equipped with a range sensor 4 (i.e., "Equipped").

The success or failure of the detection by the range sensor 4 is acquired based on a sensor signal provided by the range sensor 4. For example, when the range sensor 4 detects an obstacle, the detection by the range sensor 4 is a success and is acquired as "Detection succeeded," and when the range sensor 4 does not detect an obstacle, the detection by the range sensor 4 is a failure and is acquired as "Detection failed." The non-detection of the obstacle by the range sensor 4 is acquired as "Detection failed," because if a wireless communication apparatus 1 of a lead vehicle is in a condition that allows reception of the sensor state information from the wireless communication apparatus 1 of an immediate following vehicle (i.e., a vehicle in the same lane as the self-vehicle, traveling just behind the self-vehicle), the range sensor 4 of the immediate following vehicle is highly likely detecting the lead vehicle.

Further, if it is determined as a situation that an obstacle within a detection range of the range sensor 4 is not detected (i.e., sensor lost situation), such situation may be provided as "detection failed." Therefore, the control unit 12 is equivalent to a lost determination unit in claims.

Whether there is a sensor lost situation is determined in the following manner. Based on the satellite-measured position of an immediate lead vehicle received from the wireless communication apparatus 1 of the immediate lead vehicle (i.e., a vehicle in the same lane as the self-vehicle, traveling just in front of the self-vehicle) and the satellite-measured position of the self-vehicle, an inter-vehicle distance between the self-vehicle and the immediate lead vehicle is calculated. If the range sensor 4 is not detecting an obstacle even when the calculated inter-vehicle distance is equal to or smaller than the detection range of the range sensor 4, it is determined as a sensor lost situation.

When a sensor lost situation is occurring in the self-vehicle, the control unit 12 of the wireless communication apparatus 1a of the self-vehicle detects and calculates, just like the control unit 12 of the wireless communication apparatus 1b, at the sensor lost time, the distance between the self-vehicle and the immediate lead vehicle, based on the satellite-measured position and the travel direction of the lead vehicle, which are received from the wireless communication apparatus 1 of the immediate lead vehicle and the satellite-measured position of the self-vehicle. Then, the self-vehicle is controlled to follow the other vehicle by keeping the detected inter-vehicle distance at the preset value, for the convoy travel of the vehicles including the self-vehicle. The convoy travel of the vehicles is performed according to the well-known method.

On the other hand, there is no sensor lost situation when the calculated inter-vehicle distance is greater than the detection range of the range sensor 4 and the range sensor 4 is not detecting an obstacle. In this case, how to identify the immediate lead vehicle relative to the self-vehicle as well as how the satellite-measured positions and the travel directions are associated with the self-vehicle and the other vehicle(s) are described later in the specification.

Further, a situation in which a certain duration (e.g., tens of seconds) of obstacle detection by the range sensor 4 followed by a preset duration (e.g., couple of seconds) of no obstacle detection may be determined as a sensor lost situation, and after such preset duration, the situation may be determined as no sensor lost situation, or "sensor alive situation." Furthermore, alternation of successful detection and detection failure of the obstacle at a few second interval may also be determined as the sensor lost situation.

The control unit 12 receives the prediction information and the sensor state information transmitted from the wireless communication apparatus 1 carried by one or more vehicles. Based on the prediction information including the satellite-measured position and the travel direction of the other vehicle(s) and the satellite-measured position and the travel direction of the self-vehicle, the control unit 12 calculates the travel locus of the self-vehicle and the travel loci of the other vehicle(s). In such manner, each of the other vehicle(s), or, each of the wireless communication apparatuses 1 disposed in the other vehicle(s), is identified, and relative positions of the other vehicle(s) are calculated relative to the self-vehicle.

Further, for example, the control unit 12 identifies the immediate lead vehicle and/or the immediate following vehicle based on the relative position(s) and map data from the map data entry device 3. In the example of the present embodiment, the wireless communication apparatus 1a of the vehicle A identifies the vehicle B as the immediate following vehicle, and the wireless communication apparatus 1a of the vehicle B identifies the vehicle A as the immediate lead vehicle, and identifies the vehicle C as the immediate following vehicle.

Here, the correspondence between the self-vehicle and the other vehicle regarding the satellite-measured positions and the travel directions at a time of the above identification of the immediate lead/following vehicle is established based on the GPS time at the time of detection of such positions and directions. The GPS time at the time of detection of the satellite-measured position and the travel direction of the other vehicle used for such correspondence is the one that is added to and transmitted with the prediction information. Further, the satellite-measured position and the travel direction detected by self-vehicle is successively stored in the memory of the RAM or the like of the control unit 12 in association with the GPS time at the time of detection of the position/direction.

Further, when the immediate lead vehicle is detected by the range sensor 4, the control unit 12 detects a distance between the self-vehicle and the immediate lead vehicle by calculating a distance between the self-vehicle and the immediate lead vehicle detected by the range sensor 4. Then, the self-vehicle is controlled to follow the immediate lead vehicle by keeping the detected distance at a preset value (i.e., a convoy travel of vehicles). The convoy travel of the vehicles may be performed according to a well-known method. For example, by sending instructions to the brake ECU 5 and an engine ECU (not illustrated), the self-vehicle may accelerate/decelerate, and, by sending instructions to non-illustrated ECU that controls steering actuators, the tires of the self-vehicle are steered, for organizing the convoy travel of the vehicles.

The inter-vehicle distance may be configured to have a value that is set according to the vehicle speed, or may have a constant value. Further, the control unit 12 of the self-vehicle may also use the prediction information received from the wireless communication apparatus 1 of the immediate lead vehicle, for the convoy travel of the vehicles.

Further, the control unit 12 performs a transmission cycle control process for controlling the transmission cycle of transmitting the information from the self-vehicle, according to the sensor state information received from the immediate following vehicle. Whether the sensor state information has been received from the immediate following vehicle is determined in the following manner. That is, when the satellite-measured position and the travel direction of the other vehicle in the prediction information that is transmitted together with the sensor state information are in a "successive" relationship with the travel locus of the immediate following vehicle identified in the above-described manner, the sensor state information is determined as having been received from the immediate following vehicle. Therefore, the control unit 12 is equivalent to a following vehicle information reception determination unit in claims. The transmission cycle control process is described later in detail.

Further, when the control unit 12 performs a sensor lost handling process when a sensor lost situation is detected in the self-vehicle. Details of such process is described later in detail.

Figure 3:
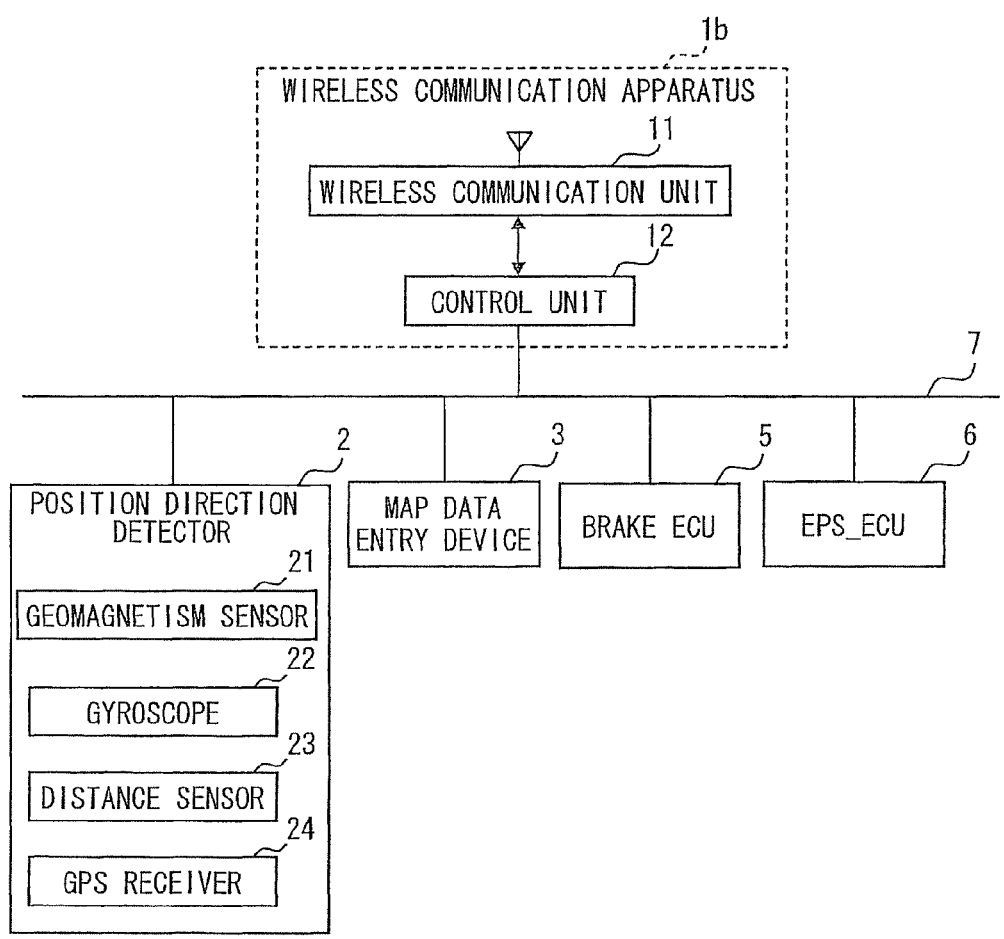
FIG. 3 is a schematic configuration of a wireless communication apparatus disposed in a vehicle without a range sensor.

With reference to FIG. 3, a block diagram of a wireless communication apparatus 1b is shown. The wireless communication apparatus 1b is disposed in a vehicle that is not equipped with a range sensor but is equipped with a receiver of the satellite positioning system, such as the vehicle C of the present embodiment. Similar to the wireless communication unit 1a, the wireless communication apparatus 1b includes the wireless communication unit 11 and the control unit 12. Further, the wireless communication apparatus 1b is communicably coupled to vehicle components, such as the position direction detector 2, the map data entry device 3, the brake ECU 5, and the EPS_ECU 6. The wireless communication apparatus 1b, the position direction detector 2, the map data entry device 3, the brake ECU 5, and the EPS_ECU 6 may be communicably coupled with each other via, for example, an in-vehicle LAN 7, which is compliant with communication protocol, such as CAN (i.e., controller area network).

The wireless communication apparatus 1b has the same configuration as the wireless communication apparatus 1a except that it does not exchange the information with the range sensor 4 and it does not perform a process based on the information input from the range sensor 4. Therefore, for illustration purposes, like parts have like numbers in the drawings of wireless communication apparatus 1a and wireless communication apparatus 1b, and the description of the like parts may be omitted. In addition, details applicable to both wireless communication apparatus 1a and 1b may be referred to as wireless communication apparatus 1.

Similar to the wireless communication 1a, the control unit 12 of the wireless communication apparatus 1b is a well-known type computer, having a bus line for connecting a processor and memories, such as a CPU, a ROM a RAM, an EEPROM, as well as an input/output (none illustrated). The control unit 12 performs various processes, based on various information provided by the wireless communication unit 11, the position direction detector 2, the map data entry device 3, the brake ECU 5, and the EPS_ECU 6.

For instance, the control unit 12 of the wireless communication apparatus 1b acquires the above-mentioned prediction information at regular intervals, and transmits the information from the wireless communication unit 11. Further, in the present embodiment, when the prediction information is transmitted by the control unit 12, the control unit 12 adds, to the prediction information, a GPS measured detection time (i.e., a GPS time) indicating a time of detection of both of the satellite-measured position and the travel direction, and transmits the prediction information together with the GPS time.

The control unit 12 of the wireless communication apparatus 1b acquires the above-described sensor state information, and transmits the information via the wireless communication unit 11 together with the prediction information. Since, the vehicle, which has the wireless communication apparatus 1b installed therein, does not have a range sensor 4, the sensor state information provides that the self-vehicle having the wireless communication apparatus 1b is not equipped with a range sensor 4. Therefore, for example, the vehicle C of the present embodiment is provided as not equipped with a range sensor 4 (i.e., "Not Equipped"). Accordingly, the prediction information of the vehicle C or a vehicle not equipped with a range sensor 4, does not or cannot include a success or failure of detection by a range sensor 4.

Based on the prediction information and the sensor state information transmitted from the wireless communication apparatuses 1 of other vehicle(s), the control unit 12 of the wireless communication apparatus 1b identifies each of the other vehicle(s) and calculates the relative position of each of the other vehicle(s) in the above-described manner. For instance, the control unit 12 of the wireless communication apparatus 1b identifies the immediate lead vehicle and the immediate following vehicle of the self-vehicle based on the relative position and the map data input from the map data entry device 3. In the example of the present embodiment, the wireless communication apparatus 1b of the vehicle C identifies the vehicle B as the immediate lead vehicle.

Further, when the control unit 12 of the wireless communication apparatus 1b receives the prediction information that is transmitted from the immediate lead vehicle, the control unit 12 of the wireless communication apparatus 1b detects the inter-vehicle distance between the self-vehicle and the immediate lead vehicle by calculating the distance between the self-vehicle and the immediate lead vehicle based on the satellite-measured position of the immediate lead vehicle received from the wireless communication apparatus 1 of the immediate lead vehicle and the satellite-measured position of the self-vehicle. The correspondence between the self-vehicle and the other vehicle(s) regarding the satellite-measured position and the travel direction at a time of the above detection of the inter-vehicle distance is established in the same manner as described above. Further, the self-vehicle may be controlled to follow the immediate lead vehicle by keeping the detected inter-vehicle distance at a preset value (i.e., a convoy travel of vehicles). The convoy travel of the vehicles, which organizes a train of vehicles following the lead vehicle, may be performed according to a well-known method.

The inter-vehicle distance may be configured to have a value that is set according to the vehicle speed, or may have a constant value. Further, the control unit 12 of the wireless communication apparatus 1b may also use the prediction information of other kinds, that is, the prediction information other than the satellite-measured position and the travel direction, from the wireless communication apparatus 1 of the immediate lead vehicle, for the convoy travel of the vehicles.

Further, the control unit 12 of the wireless communication apparatus 1b does not determine the sensor lost situation, and does not perform the sensor lost handling process, since the vehicle having the wireless communication apparatus 1b does not have the range sensor 4.

Figure 4:
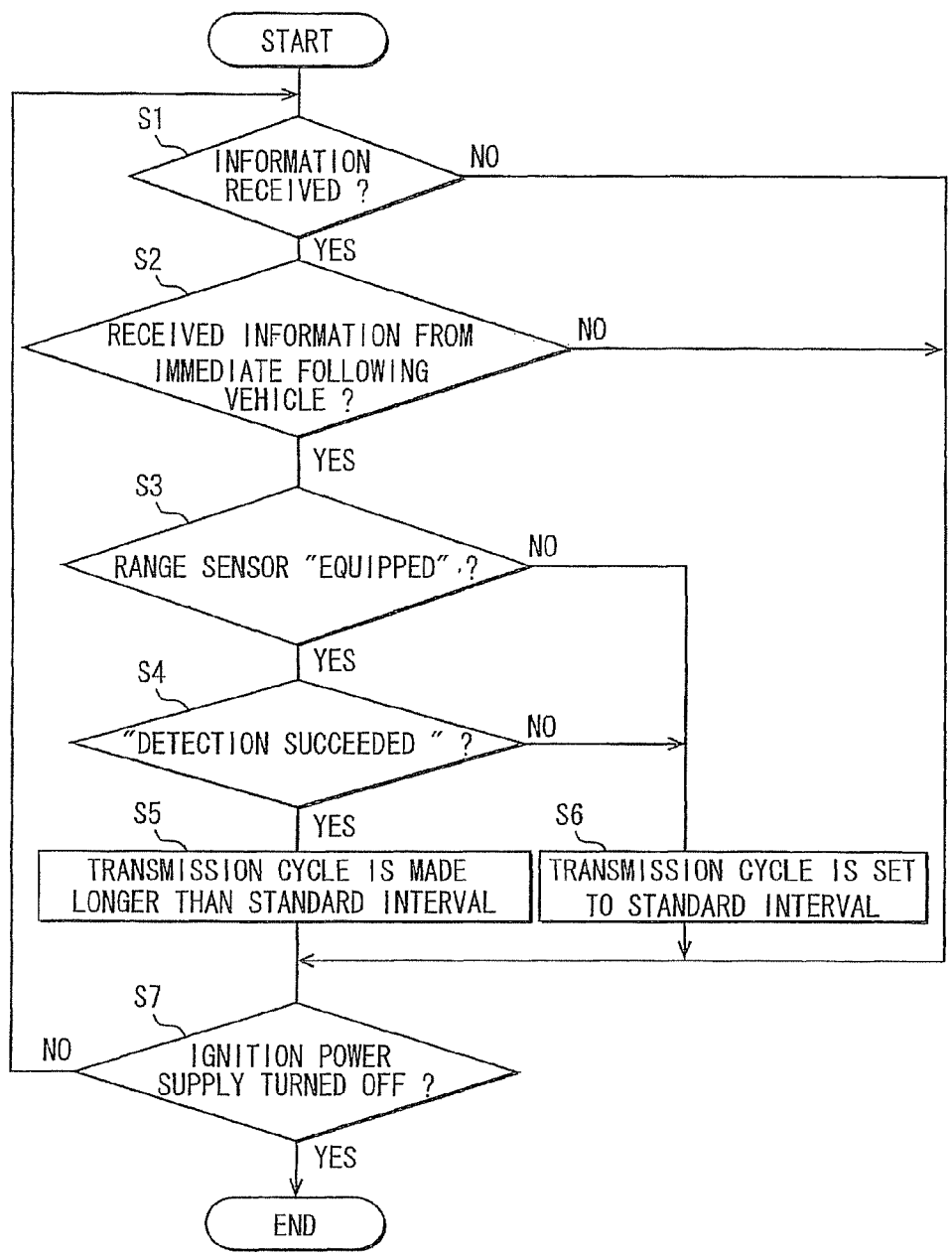
FIG. 4 is a flowchart of a transmission cycle control process of a control unit of the wireless communication apparatus of FIGS. 2 and 3.

With reference to FIG. 4, details of the transmission cycle control process performed by the control unit 12 of the wireless communication apparatus 1 (i.e., both wireless communication apparatus 1a and 1b) is described. FIG. 4 is a flowchart of the transmission cycle control process by the control unit 12 of the wireless communication apparatus 1. When, for example, an ignition power supply of the self-vehicle and a power supply for the wireless communication apparatus 1 is turned on, the process of the flowchart is started.

In step S1, the process determines whether the prediction information and the sensor state information transmitted from the wireless communication apparatus 1 of another vehicle have been received. For example, based on an input of the prediction information and the sensor state information to the control unit 12, which are received via the wireless communication unit 11, the process may determine that the prediction information and the sensor state information have been received (step S1. YES). After it is determined that the prediction information and the sensor information have been received, the process proceeds to step S2. Further, the process proceeds to step S7 when the prediction information and the sensor information were not received (i.e., step S1, NO).

In step S2, the process determines whether the prediction information and the sensor information are from the immediate following vehicle. Whether the prediction information and the sensor information are from the immediate following vehicle may be determined in the above-described manner. If the prediction information and the sensor information is from the immediate following vehicle (step S2, YES), the process proceeds to step S3, and if not (step S2, NO), the process proceeds to step S7.

In the example of the present embodiment, the wireless communication apparatus 1a installed in the vehicle A is determined as receiving the information (i.e., the prediction and sensor state information) from the immediate following vehicle, when it receives the prediction information and the sensor state information from the wireless communication apparatus 10 of the vehicle B. Further, the contents of the sensor state information from the wireless communication apparatus 1a of the vehicle B, which are received by the wireless communication apparatus 1a of the vehicle A, indicates the vehicle B is equipped with a range sensor 4, which is designated as "Equipped," the type of the range sensor 4 of the vehicle B is "a laser radar", and provides the detection success/failure by the range sensor 4, which is designated as either as "Detection succeeded" or "Detection failed." In this case, the wireless communication apparatus 1a installed in the vehicle A is equivalent to a vehicular wireless communication apparatus in claims, and the wireless communication apparatus 1a installed in the vehicle B is equivalent to an object vehicle side wireless communication apparatus in claims.

As for the wireless communication apparatus 1e installed in the vehicle B, the apparatus 1a on the vehicle B is determined as receiving the information (i.e., the prediction and sensor state information) from the immediate following vehicle, when it receives the prediction information and the sensor state information from the wireless communication apparatus 1b of the vehicle C. Further, the contents of the sensor state information from the wireless communication apparatus 1b of the vehicle C indicates that the vehicle C is "Not Equipped" with the range sensor 4. In this case, the wireless communication apparatus 1a installed in the vehicle B is equivalent to a vehicular wireless communication apparatus in claims, and the wireless communication apparatus 1b installed in the vehicle C is equivalent to an object vehicle side wireless communication apparatus in claims.

In step S3, when the sensor state information received from the immediate following vehicle indicates that the immediate following vehicle is equipped with the range sensor 4 (i.e., "Equipped," or, step S3. YES), the process proceeds to step S4. If the information indicates that the immediate following vehicle is not equipped with the range sensor 4 (i.e., "Not-equipped," or, step S3, NO), the process proceeds to step S6.

In step S4, when the sensor state information from the immediate following vehicle indicates the detection success/failure as "Detection succeeded" (step S4, YES), the process proceeds to step S5. If it indicates the detection success/failure as "Detection failed" (step S4, NO), the process proceeds to step S6.

In step S5, the transmission cycle of information transmission from the wireless communication unit 11 of the self-vehicle is controlled to have a longer interval than a standard interval, and the process proceeds to step S7. The standard interval in the above is an interval of the transmission cycle used for a normal time information transmission, such as 100 milli-seconds (msec), which may be arbitrarily set, and the longer interval of the transmission cycle that is longer than the standard interval may be, for example, 1 sec, in the following description.

In step S6, the transmission cycle of information transmission from the wireless communication unit 11 of the self-vehicle is controlled to have the standard interval of 100 msec, and the process proceeds to step S7.

According to the above, in case that the immediate following vehicle is equipped with the range sensor 4 (i.e., "Equipped") and the detection by the range sensor 4 is "Detection succeeded," the transmission cycle for transmitting information from the wireless communication unit 11 of the self-vehicle is set to the interval of 1 sec. On the other hand, in case that the immediate following vehicle is not equipped with the range sensor 4 (i.e., "Not-equipped"), or, in case that the immediate following vehicle is equipped with the range sensor 4 (i.e., "Equipped") and the detection result by the range sensor 4 is "Detection failed," the transmission cycle for transmitting information from the wireless communication unit 11 of the self-vehicle is set to the interval of 100 msec. The control unit 12 is equivalent to a transmission cycle control unit in claims.

Further, the transmission cycle may have a lower limit value, such as 90 msec for the standard interval of 100 msec, and, in such case, the transmission cycle of 90 msec to 100 msec may be considered as the standard interval. In other words, the transmission cycle is controlled, in the above case, at least not to have an interval under 90 msec. In such manner, even when the lower limit value is defined, the transmission cycle (i.e., the interval of the transmission cycle) is prevented to fall below such lower limit value.

In step S7, if the ignition power supply is turned off (step S7, YES), the flowcharted process is finished. Further, when the ignition power supply of the self-vehicle is not turned off (step S7, NO), the process returns to step S1 for repeating the process.

Figure 5:
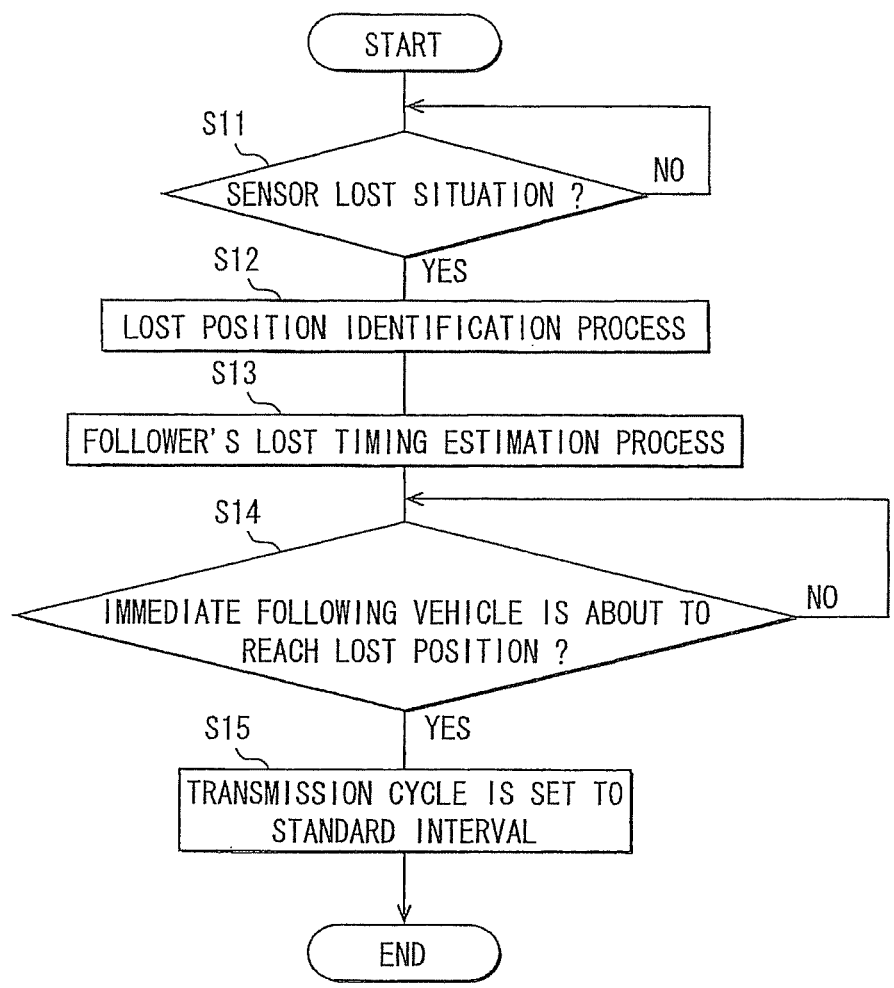
FIG. 5 is a flowchart of a sensor lost handling process of the control unit of the wireless communication apparatus of FIG. 2.

With reference to FIG. 5, the sensor lost handling process by the control unit 12 of the wireless communication apparatus 1a is described. The process of FIG. 5 is started when, for example, the transmission cycle is changed from the standard interval to the longer interval based on the transmission cycle control process according to the sensor state information that is received from the immediate following vehicle, where the self-vehicle is the immediate lead vehicle to the immediate following vehicle and both the self-vehicle and the immediate following vehicle include a range sensor 4. The process is finished when the transmission cycle returns to the standard interval by the control of the transmission cycle control process, or when the ignition power supply of the self-vehicle is turned off.

In step S11 of FIG. 5, the process determines whether a sensor lost situation is occurring with the range sensor 4 of the self-vehicle. For instance, whether vehicle A is experiencing a sensor lost situation with the range sensor 4 disposed therein. If a sensor lost situation is occurring, (step S11, YES), the process proceeds to step S12, and if it is not occurring (step S11, NO), the process repeats step S11.

In step S12, a lost position identification process is performed, and the process proceeds to step S13. The lost position identification process determines the position of the self-vehicle where the sensor lost situation occurred/detected of detection failure by the range sensor 4 of the self-vehicle, which is provided as a lost position. Specifically, based on the self-vehicle's satellite-measured position successively detected by the position direction detector 2 of the self-vehicle at the time of the sensor lost situation, the lost position identification process determines the lost position. Therefore, the control unit 12 is equivalent to a lost position identification unit in claims.

In step S13, a follower's lost timing estimation process is performed, and the process proceeds to step S14. Based on the prediction information and the GPS time received from the immediate following vehicle, the follower's lost timing estimation process estimates a timing of the immediate following vehicle to reach the lost position determined in step S12. Specifically, a time when a predicted traveling position of the immediate following vehicle, which is calculated based on the prediction information from the immediate following vehicle, matches with the lost position, such timing is estimated as the follower's lost timing. Further, the follower's lost timing may be estimated as a period of time for the traveling position of the immediate following vehicle to reach the lost position. The matching of the traveling position of the immediate following vehicle may be an exact match, or may be a substantial match, between the predicted position and the lost position. For instance, the follower's lost timing of the vehicle B (i.e., immediate following vehicle) would be the estimated period of time for the vehicle B to reach the lost position of where the range sensor 4 of vehicle A (i.e., self-vehicle and the immediate lead vehicle of vehicle B) experienced the sensor lost position.

In step S14, whether the immediate following vehicle is about to reach the lost position is determined. More practically, when the follower's lost timing calculated by the follower's lost timing estimation process is approaching, or is about to arrive with a lapse of preset seconds, it is determined that the follower's lost timing is coming. The preset seconds may be set to a zero second, or may be set to a few seconds. If it is determined that the follower's lost timing is approaching (step S14, YES), the process proceeds to step S15. If it is not determined that the follower's lost timing is coming (step S14. NO), the process repeats step S14.

Further, the above determination scheme of the follower's lost timing may be modified. That is, instead of determining that the follower's lost timing is approaching when the lost timing estimated by the estimation process is about to arrive with a lapse of preset seconds, it may be determined when, by successively calculating the satellite-measured position of the immediate following vehicle based on the prediction information from the following vehicle (i.e., by calculating a real-time position of the immediate following vehicle), the calculated satellite-measured position of the immediate following vehicle is within a preset range from the lost position, the immediate following vehicle may be determined to be reaching the lost position (step S14, YES).

In step S15, the transmission cycle of transmitting information from the wireless communication unit 11 of the self-vehicle is controlled to have a value of the standard interval (e.g., 100 msec in the present embodiment), and the process is finished. In other words, if the self-vehicle, which is equipped with a range sensor 4 (e.g., vehicle A), experiences a sensor lost position, it is likely that the immediate following vehicle, which also includes a range sensor 4 (e.g., vehicle B) will also experience a sensor lost position at the same position. Therefore, once the immediate following vehicle (e.g., vehicle B) is approaching the lost position (step S14, YES) the self-vehicle (e.g., vehicle A) changes from the longer interval to the standard interval Based on the present disclosure, the immediate following vehicle may need to automatically control the inter-vehicle distance between the immediate following vehicle and the self-vehicle, when the immediate following vehicle follows the self-vehicle for organizing a convoy travel of the vehicles. In such case, the necessity of positioning the immediate following vehicle based on the satellite-measured position by the immediate following vehicle itself may change, depending on the detection success/failure of the obstacle (i.e., the self-vehicle) by the range sensor 4 and/or whether the vehicle (i.e., the immediate following vehicle) is equipped with the range sensor 4.

More specifically, if the immediate following vehicle is equipped with the range sensor 4, such as vehicle B, and that range sensor 4 is successfully detecting the self-vehicle (i.e., the immediate lead vehicle to the immediate following vehicle), such as vehicle A for vehicle B, the immediate following vehicle can independently detect the inter-vehicle distance between the immediate following vehicle and the self-vehicle. Therefore, for such immediate following vehicle, the necessity of detecting the satellite-measured position of the immediate lead vehicle is low, and such immediate following vehicle may not need to receive information regarding the satellite-measured position of the immediately lead vehicle very frequently. In the present embodiment, for example, the vehicle B that is successfully detecting the vehicle A by the range sensor 4 of the vehicle B may not frequently need to receive information regarding position information of vehicle A.

On the other hand, if the immediate following vehicle is not equipped with the range sensor 4, or if the immediate following vehicle's range sensor 4 fails to detect the immediate lead vehicle, the immediate following vehicle needs to detect the inter-vehicle distance to the immediate lead vehicle based on the satellite-measured position of the immediate following vehicle itself, which is positioned by the satellite system such as GPS or the like, and the satellite-measured position of the immediate lead vehicle transmitted from the immediate lead vehicle. Therefore, such immediate following vehicle needs to frequently receive information regarding the satellite-measured position of the immediately lead vehicle. In the present embodiment, for example, the vehicle C, which is an immediately following vehicle of vehicle B, is not equipped with the range sensor 4, therefore, the vehicle B may need to frequently transmit information to vehicle C. In addition, if the range sensor 4 of the vehicle B, which is an immediate following vehicle to vehicle A, fails to detect the vehicle A, the vehicle A may need to frequently transmit information to vehicle B.

In view of the above, when it is not necessary for the immediate following vehicle to frequently receive the satellite-measured position of the self-vehicle (i.e., the immediate lead vehicle to the immediate following vehicle), the transmission cycle of such position from the self-vehicle to the immediate following vehicle may be set to have a longer interval. Additionally, when it is necessary for the immediate following vehicle to frequently receive the position of its the self-vehicle, the transmission cycle of such position may be set to have a shorter interval. As a result, when the information is transmitted through the vehicle-to-vehicle communication, while the congestion of the information is avoided, the information is transmitted at a more suitable frequency.

Further, at the lost position, it is assumed that the range sensor 4 of the immediate following vehicle highly likely fails to detect the obstacle (i.e., the immediate lead vehicle for that immediate following vehicle). In view of such situation, the present embodiment proposes a scheme that, even when the transmission cycle of transmitting the information from the self-vehicle (i.e., the immediate lead vehicle to the immediate following vehicle) is set to have a longer interval due to the sensor state information from the immediate following vehicle having the "Detection succeeded" value, the transmission cycle of transmitting the information is set to have the shorter interval just before the arrival of the immediate following vehicle at the lost position.

Therefore, even when the range sensor 4 of the immediate following vehicle fails to detect the obstacle at the above-described lost position, the immediate following vehicle can swiftly receive the satellite-measured position of the self-vehicle (i.e., the immediate lead vehicle for that immediate following vehicle), and can then detect and calculate the inter-vehicle distance to the immediate lead vehicle based on the satellite-measured position of the immediate following vehicle and the satellite-measured position of the self-vehicle. Therefore, when the information is transmitted through the vehicle-to-vehicle communication, while the congestion of the information is avoided, the information is transmitted at a more suitable frequency.

In the present embodiment, the transmission cycle of transmitting the information from the wireless communication unit 11 is changed under control of the control unit 12 according to whether the vehicle is equipped with the range sensor 4 and whether the detection by the range sensor 4 has succeeded or failed. However, the transmission output (i.e., intensity or electric power of radio wave or signal) of such information transmission may also be changed according to the above conditions. Therefore, the control unit 12 is equivalent to a transmission output control unit in claims.

More specifically, when the sensor state information (i.e., independent sensor information in claims) received from the wireless communication apparatus 1 of the immediate following vehicle indicates that the immediate following vehicle is equipped with the range sensor 4 (i.e., "Equipped") and the detection by the sensor 4 has succeeded (i.e., "Detection succeeded"), the transmission output may be set to have a smaller value that is smaller than a standard value. On the other hand, when the sensor state information received from the wireless communication apparatus 1 of the immediate following vehicle indicates that the immediate following vehicle is not equipped with the range sensor 4 (i.e., "Not-equipped"), or when such information indicates that the vehicle is equipped with the range sensor 4 (i.e., "Equipped") and the detection by the sensor 4 has failed (i.e., "Detection failed"), the transmission output is returned to the standard value. The standard value described above is a value set as a transmission output at a normal time, and may have an arbitrarily set value.

According to the above configuration, when it is not necessary for the immediate following vehicle to frequently receive the satellite-measured position of its own, the transmission output of transmitting the information from the wireless communication unit 11 of the self-vehicle is set to have a smaller-than-standard value, thereby preventing the interference of the radio wave to other wireless communication systems, and, when it is necessary for the immediate following vehicle to frequently receive the satellite-measured position of its own, the transmission output from the wireless communication unit 11 is returned to have the standard value, thereby making it easy for the immediate following vehicle to receive the information.

As provided above, when the sensor state information (i.e, independent sensor information in claims) indicates that the immediate following vehicle is equipped with the range sensor, it is highly likely that the immediate following vehicle may not need to frequently receive the current position information of the subject vehicle (immediate lead vehicle). Therefore, the transmission cycle is controlled to have the longer interval. On the other hand, when the independent sensor information indicates that the immediately following vehicle is not equipped with the range sensor, it is highly likely that the immediate following vehicle frequently needs to receive the current position information of the subject-vehicle. Therefore, the transmission cycle is controlled to have the shorter interval. In such manner, the vehicle-to-vehicle communication for information transmission becomes more congestion-proof while the transmission cycle is adjusted to have a more suitable frequency or interval.

Further, when the transmission cycle/output is changed depending solely on whether the detection by the range sensor 4 has succeeded or failed, the longer interval or the weaker output may be set according to the "Detection succeeded" value, and the shorter interval or the stronger output may be set according to the "Detection failed" value.

When the independent sensor information indicates that the range sensor 4 of the immediate following vehicle has successfully detected the obstacle (i.e., immediate lead vehicle), the immediate following vehicle is able to determine the inter-vehicle distance independently, thereby making it less necessary for the immediate following vehicle to use the current position of the subject vehicle (i.e., immediate lead vehicle) for determining the inter-vehicle distance. Therefore, the transmission cycle of the subject vehicle in claims for providing information to the immediate following vehicle may have a longer interval.

On the other hand, when the independent sensor information indicates that the range sensor 4 of the immediate following vehicle has not successfully detected the obstacle (immediate lead vehicle), the immediate following vehicle may have to frequently receive the current position information of the subject vehicle. Therefore, the transmission cycle may have a longer interval when the immediate following vehicle needs not frequently receive the current position information of the subject vehicle, and, also control the information transmission to have a shorter interval for the transmission cycle when the immediate following vehicle needs to frequently receive the current position information of the subject vehicle. In such manner, the vehicle-to-vehicle communication for information transmission becomes more congestion-proof while the transmission cycle is adjusted to have a more suitable frequency or interval.

Although the present disclosure has been fully described in connection with the preferred embodiment thereof with reference to the accompanying drawings, it is to be noted that various changes and modifications will become apparent to those skilled in the art.

For example, the transmission cycle/output may be changed solely depending on whether the vehicle is equipped with the range sensor 4, or solely depending on whether the detection by the range sensor 4 has succeeded or failed.

When the transmission cycle/output is changed depending solely on whether the vehicle is equipped with the range sensor 4, the longer interval or the weaker output may be set according to the "Equipped" value, and the shorter interval or the stronger output may be set according to the "Not-equipped" value.

Furthermore, detection/calculation of the inter-vehicle distance based on the satellite-measured position of the immediate lead vehicle and the satellite-measured position of the self-vehicle in the above-described embodiment may be changed to, for example, detection/calculation of the inter-vehicle distance based on non-satellite-measured current position of the vehicles (i.e., the immediate lead vehicle and the self-vehicle).

Such changes and modifications are to be understood as being within the scope of the present disclosure as defined by the appended claims.

What is claimed is:

1. A vehicular wireless communication apparatus, disposed in a subject vehicle, communicating with an object vehicle side wireless communication apparatus disposed in an object vehicle, the vehicular wireless communication apparatus comprising:
    an information acquisition unit successively acquiring an information at least including a current position information of the subject vehicle, the information acquired being transmitted through wireless communication;
    a reception unit receiving, from the object vehicle side wireless communication apparatus, (i) current position information indicating a position of the object vehicle and (ii) an independent sensor information indicating at least one of (a) whether the object vehicle is equipped with a range sensor that independently detects a distance to an obstacle in front of the object vehicle and (b) whether the range sensor has succeeded or failed to detect the obstacle;
    a following vehicle information reception determination unit determining whether the object vehicle is an immediate following vehicle immediately following the subject vehicle, based on a current position of the subject vehicle acquired by the information acquisition unit and the current position information of the object vehicle received by the reception unit; and
    a transmission cycle control unit changing a transmission cycle for transmitting the current position information of the subject vehicle, wherein
    when the following vehicle information reception determination unit determines that the object vehicle is the immediate following vehicle of the subject vehicle, the transmission cycle control unit changes the transmission cycle based on the independent sensor information of the immediate following vehicle.

2. The vehicular wireless communication apparatus of claim 1, wherein
    the following vehicle information reception determination unit determines the object vehicle is the immediate following vehicle of the subject vehicle,
    the transmission cycle control unit changes the transmission cycle to have a second interval that is longer than a first interval, when the independent sensor information indicates the range sensor has succeeded to detect the obstacle, and
    the transmission cycle control unit changes the transmission cycle to have a third interval that is shorter than the first interval, when the independent sensor information indicates the range sensor has failed to detect the obstacle.

3. The vehicular wireless communication apparatus of claim 2 further comprising:
    a lost determination unit determining whether a range sensor disposed on the subject vehicle for detecting an obstacle in front of the subject vehicle has failed to detect the obstacle, and
    a lost position identification unit identifying a lost position based on the current position information of the subject vehicle acquired by the information acquisition unit when the lost determination unit determines that the range sensor has failed to detect the obstacle, the lost position being a position where the range sensor of the subject vehicle failed to detect the obstacle, wherein
    when the transmission cycle of transmitting the information from the subject vehicle is set to the second interval, the transmission cycle control unit changes the transmission cycle to an interval shorter than the second interval before the arrival of the immediate following vehicle at the lost position.

4. The vehicular wireless communication apparatus of claim 3, wherein when the transmission cycle is controlled to the interval shorter than the second interval, the interval is equal to the first interval.

5. The vehicular wireless communication apparatus of claim 2 further comprising:
    a transmission output control unit controlling a transmission output, wherein,
    the transmission output control unit controls the transmission output of transmitting the information to have a smaller value that is smaller than a preset standard output value when the transmission cycle control unit controls the transmission cycle to the second interval, and
    the transmission output control unit controls the transmission output of transmitting the information to the preset standard output value when the transmission cycle control unit controls the transmission cycle to the first interval.

6. The vehicular wireless communication apparatus of claim 1, wherein
    the following vehicle information reception determination unit determines the object vehicle is the immediate following vehicle of the subject vehicle,
    the transmission cycle control unit changes the transmission cycle to have a second interval that is longer than a first interval, when the independent sensor information indicates the object vehicle is equipped with the range sensor and the range sensor has succeeded to detect the obstacle, and the transmission cycle control unit changes the transmission cycle to have a third interval that is shorter than the first interval when the independent sensor information indicates (a) the object vehicle is not equipped with the range sensor or (b) the object vehicle is equipped with the range sensor and the range sensor has failed to detect the obstacle.

7. The vehicular wireless communication apparatus of claim 1, wherein the following vehicle information reception determination unit determines the object vehicle is the immediate following vehicle of the subject vehicle, the transmission cycle control unit controls the transmission cycle to have a second interval that is longer than a first interval, when the independent sensor information indicates the object vehicle is equipped with the range sensor, and the transmission cycle control unit controls the transmission cycle to have a third interval that is shorter than the first interval, when the independent sensor information indicates the object vehicle is not equipped with the range sensor.

8. A communication system comprising:

a vehicular wireless communication apparatus disposed in a vehicle for establishing vehicle to vehicle communication by way of wireless communication between vehicles having the vehicular wireless communication apparatus disposed therein, the vehicular wireless communication apparatus including, an information acquisition unit successively acquiring information at least including a current position information of the vehicle, wherein the acquired information is transmitted through wireless communication, a reception unit receiving, from a vehicle side wireless communication apparatus of another vehicle, (i) current position information indicating a position of the other vehicle and (ii) an independent sensor information indicating (a) whether the other vehicle is equipped with a range sensor that independently detects a distance to an obstacle in front of the other vehicle and (b) whether the range sensor has succeeded or failed to detect the obstacle, a following vehicle information reception determination unit determining whether the other vehicle is an immediate following vehicle immediately following the vehicle, based on a current position of the vehicle acquired by the information acquisition unit and the current position information of the other vehicle received by the reception unit, a transmission cycle control unit changing a transmission cycle for transmitting the current position information of the vehicle, when the following vehicle information reception determination unit determines that the other vehicle is the immediate following vehicle of the vehicle, the transmission cycle control unit changes the transmission cycle based on the independent sensor information of the immediate following vehicle;

a subject vehicle having the vehicular wireless communication apparatus disposed therein; and an object vehicle having the vehicular wireless communication apparatus disposed therein, the object vehicle being an immediate following vehicle of the subject vehicle, wherein the vehicular wireless communication apparatus of the object vehicle transmits to the subject vehicle the current position information and the independent sensor information of the object vehicle, and the vehicular wireless communication apparatus of the subject vehicle determines that the object vehicle is an immediate following vehicle of the subject vehicle, and changes the transmission cycle for transmitting the current position information of the subject vehicle to the object vehicle based on the independent sensor information of the object vehicle.

* * * * *